United States Patent [19]
Goldstein

[11] Patent Number: 4,827,125
[45] Date of Patent: May 2, 1989

[54] CONFOCAL SCANNING LASER MICROSCOPE HAVING NO MOVING PARTS

[75] Inventor: Seth R. Goldstein, Bethesda, Md.

[73] Assignee: The United States of America as represented by the Secretary of the Department of Health and Human Services, Washington, D.C.

[21] Appl. No.: 44,021

[22] Filed: Apr. 29, 1987

[51] Int. Cl.$^4$ ............................................... H01J 3/14
[52] U.S. Cl. .................................... 250/234; 250/216
[58] Field of Search ................ 250/234, 235, 213 VT, 250/310, 397, 216; 358/209; 350/507, 484; 356/434

[56] References Cited

U.S. PATENT DOCUMENTS

| | | | |
|---|---|---|---|
| 2,037,711 | 4/1936 | Farnsworth | 178/6 |
| 2,100,842 | 11/1937 | Farnsworth | 250/27.5 |
| 2,124,057 | 7/1938 | Farnsworth | 178/7.2 |
| 2,126,265 | 10/1940 | Farnsworth | 178/7.2 |
| 2,142,086 | 12/1946 | Hallmark | 178/7.2 |
| 2,160,672 | 5/1939 | Ploke | 250/153 |
| 2,459,778 | 1/1949 | Larson | 178/7.2 |
| 3,941,484 | 3/1976 | Dreyfus | 356/398 |
| 4,198,571 | 4/1980 | Sheppard | 250/571 |
| 4,207,554 | 6/1980 | Resnick et al. | 382/6 |
| 4,272,190 | 6/1981 | Shapiro | 356/124 |
| 4,634,240 | 1/1987 | Suzuki et al. | 350/508 |

OTHER PUBLICATIONS

Y. Ichioka, et al., "Digital Scanning Laser Microscope", Applied Optics, vol. 24, No. 5, Mar. 1, 1985, pp. 691-696.

"Theory and Practice of Scanning Optical Microscopy", Wilson, et al., Academic Press, 1984, pp. 1-11.
"Image, Formation, and Processing in the Scanning Optical Microscope", *Applied Physics,* 22:124-128 (1980).
"New Horizons for Light Microscopy", *Science,* 230:1258-1262 (Dec. 13, 1985).
"Developments in High Resolution Confocal Scanning Light Microscopy (CSLM)", *Scanned Image Microscopy,* Academic Press (1980), pp. 183-200.
"Confocal Scanning Light Microscopy . . . ", Valkenburg, et al., *Journal of Bacteriology,* pp. 478-483 (Feb. 1985).
"High-Resolution Confocal Scanning Light Microscopy in Biology", *A. Chimica Acta,* 163:231-236 (1984).
"Three-Dimensional Chromatin Distribution . . . ", *Nature,* 317, (Oct. 1985).
"Development of a Real-Time Scanning Laser Microscope for . . . ", *Applied Optics,* 25:4115-4121 (Nov. 15, 1986).

*Primary Examiner*—David C. Nelms
*Attorney, Agent, or Firm*—Holman & Stern

[57] ABSTRACT

A confocal scanning laser microscope has no moving parts and displays real time video images. The image of the scanned laser spot on the specimen is focused on the photocathode of an image dissector tube having an electron image deflection that is synchronized and aligned with the laser scan. This permits the confocal pinhole to be scanned at video rates. Acousto-optic deflectors are responsive to the frequencies of respective scan control signals to effect horizontal and vertical laser beam deflection.

22 Claims, 4 Drawing Sheets

CONFOCAL SCANNING LASER MICROSCOPE HAVING NO MOVING PARTS

BACKGROUND OF THE INVENTION

1. Technical Field

The present invention is concerned with improved methods and apparatus relating to confocal scanning optical microscopy and, in particular, to a confocal scanning laser microscope having no moving parts and the capability of providing real time video images of the scanned object.

2. Discussion of the Prior Art

Scanning optical microscopes and, in particular, confocal scanning optical microscopes, are well known in the prior art. For example, a confocal scanning optical microscope is disclosed in U.S. Pat. No. 4,198,571 (Sheppard). An excellent treatise on scanning optical microscopes is found in the text by Tony Wilson entitled "Theory and Practice of Scanning Optical Microscopy", Academic Press, 1984. Chapter one of that text provides an informative background discussion on scanning optical microscopes, and confocal scanning optical microscopes in particular, and is expressly incorporated herein in its entirety by this reference. Typically, the confocal scanning laser microscope includes a stationary laser beam coinciding with the optical axes of two objective lenses, the first of which focuses the beam onto a diffraction-limited spot at the specimen, the second of which images the beam emerging from the other side of the specimen onto a pinhole in front of a photodetector. In order to produce an image of the specimen, the photodetector modulates the intensity of a television raster scan performed in synchronization with a geometrically similar mechanical scan of the specimen through the laser beam. The term "confocal" is used to indicate that both objective lenses are focused on the same point on the specimen. The pinhole acts to reduce the depth of focus of the instrument while conferring an increase in lateral resolution of 1.4 times as compared with a conventional imaging microscope. Not only is the depth of field reduced, bu the pinhole rejects light reflected by de-focussed planes; that is, the pinhole greatly attenuates light originating from planes displaced from the plane of focus, or from adjacent regions within the plane of focus (i.e., due to scattering). In his text, Wilson considers the possibility of scanning the laser beam as an alternative to mechanically scanning the object and concludes that the latter is preferable. Although recognizing that beam scanning can be rapid and, therefore, many whole-picture images can be formed per second, Wilson concludes that mechanical object scanning produces higher quality images with less distortion. However, it should be noted that high quality microscope objective lenses are readily available, and that these do not significantly compromise resolution over the field. It should also be noted that in low-level fluoroscopy, where light is limited by fluorochrome bleaching, there is no microscope that provides ultimate resolution because of the mandatory signal to noise tradeoff between spatial and temporal resolution. To obtain good spatial resolution it is necessary to collect photons over a long time interval. Conversely, in order to obtain good temporal resolution it is necessary to collect photons over a large area. In other words, comparative resolution is a moot issue in choosing between beam scanning and mechanical scanning of the specimen. Wilson points out other presumed advantages of mechanical scanning of the object or specimen, such as simplified lens design when the optical path is stationary, easily achieved interference scanning microscopy without the necessity of matched optics, and less complexity than is associated with beam deflection. I have found that not all of these so-called advantages of mechanical object scanning are in fact true advantages. Rather, the main disadvantage of beam scanning relates specifically to the nature of confocal scanning microscopes and concerns a suitable arrangement for scanning the pinhole so that it remains conjugate with the laser spot as that spot sweeps a raster pattern in the specimen at video scan rates.

A condensed quantitative treatment of confocal microscope imaging is presented in another article by Wilson entitled "Imaging Properties And Application Of Scanning Optical Microscopes", appearing in "Applied Physics, Vol. 22, pages 119–128 (1980), particularly, at pages 124 through 127". In this article Wilson points out that the image of a hypothetical point object is sharper for confocal scanning microscopes (e.g., by as much as forty percent at the fifty percent intensity point) than for a conventional microscope. The mathematical expression for the point spread function intensity for the confocal case is approximately the square of the expression for intensity for the conventional microscope, resulting in a sharper point. It is also pointed out by Wilson that the confocal microscope has less attenuation of the higher spatial frequencies than does a conventional microscope. In the Wilson text "Theory And Practice Of Scanning Optical Microscopy" referred to above, Wilson discusses the optical sectioning properties of the two types of microscopes. The important point here is that a conventional light microscope provides optical sectioning by virtue of its finite depth of focus, but all of the out-of-focus light still participates in the final image; whereas the confocal scanning microscope provides optical sectioning because it sharply attenuates the out-of-focus light, and only in-focus light contributes to the image.

The optical sectioning capability is considered to be particularly important for live tissue fluorescent microscopy where stray out-of-plane fluorescence greatly impairs image quality.

Another type of confocal scanning microscope providing optical sectioning is generally referred to as the Tandem Scanning Reflected Light Microscope (TSRLM) and is described in an article appearing in Science Magazine, Vol. 230, Dec. 13, 1985 at pages 1258, 1259 and 1262. In the TSRLM an incident light beam is focused through an input group of holes in a rotating disk and passes through an objective lens which focuses the beam within the specimen. Light reflected from the focus plane passes back through the objective, is focused on a set of precisely positioned output holes in the disk which are optically congruent with the input holes via the rest of the system, and passes through to an eyepiece. Light from planes other than the focus plane does not get through the output holes and is blocked by the rotating disk. This system tends to be quite complex.

In terms of optical performance there are definite advantages to the two types of confocal scanning microscopes described above as compared to non-confocal microscopes. Their somewhat limited use to date appears to be due to a number of problems. Specifically, existing laser confocal scanning microscopes mechanically scan the specimen in a raster pattern and are inherently mechanically complex devices which are difficult to maintain and use. In addition, mechanical specimen scanning is inherently a relatively slow process so that image acquisition requires something on the order of ten seconds. Speeds required to produce high resolution images in real time would require unacceptable accelerations for live specimens. Although the Tandem Scanning Reflected Light Microscope is a real time device, it is very complex and even more difficult to maintain, and tends to be more impractical than existing laser confocal scanning microscopes.

Additional background in the art of scanning light microscopy may be found in the following publications: Brakenhoff et al, "Developments In High Resolution Confocal Scanning Light Microscopy (CSLM)", appearing in "Scanned Image Microscopy" edited by E. A. Ash, Academic Press, 1980; Valkenburg et al, "Confocal Scanning Light Microscopy Of The *Escherichia Coli* Nucleoid: Comparison With Phase-Contrast And Electron Microscope Images", appearing in the Journal of Bacteriology, February 1985, Vol. 161, No. 2, pages 478–483; Brakenhoff et al, "High-Resolution Confocal Scanning Light Microscopy In Biology", appearing in Analytical Chimica Acta, Vol. 163 (1984), pages 231–236; Brakenhoff et al, "Three-Dimensional Chromatin Distribution In Neuroblastoma Nuclei Shown By Confocal Scanning Laser Microscopy", appearing in Nature, Vol. 317, October 24, 1985, pages 748, 749.

From the foregoing it will be appreciated that the prior art confocal scanning laser microscope obtains its improved imaging properties by utilizing a pinhole to admit light which is conjugate to the diffraction-limited laser illuminated spot in the object while simulatenously rejecting light from the other object regions. To map out an image of an extended object, the image is mechanically scanned through the beam in a raster pattern. The resulting instrument is mechanically complex and relatively slow. The Tandem Scanning Microscope operates in real time but involves even greater mechanical complexity. It would appear, therefore, to be quite useful to have a microscope that operates in real time (like the Tandem Scanning unit), which has the sequential scanning type operation of a confocal laser scanning device, and which preserves the improved imaging characteristics of both but does not have the mechanical complexity of either. In my efforts to provide just such a microscope, my first efforts were directed toward speeding up the confocal laser scanning microscope. This may be done by replacing mechanical specimen scanning with some type of laser beam steering controlled to sweep the desired video raster pattern along the specimen. In addition to a variety of mechanical scanners utilizing rotating mirror-faceted wheels and electromechanically activated assemblies (e.g., galvanometer-type devices), it is known to utilize acousto-optic effects to steer a laser beam. Acousto-optic deflectors are employed in laser printers, as well as other devices, and utilize a piezoelectric transducer excited at approximately 50 MHz to establish a pressure wave in a transparent crystal which acts as a diffraction grating because the index of refraction changes with pressure. The laser beam is incident on the crystal at approximately right angles to the pressure wave. Typically, approximately seventy percent of the laser beam is diffracted into a first order beam having an exit angle from the crystal which is proportional to the inverse of pressure wavelength. By varying the piezoelectric excitation frequency with a voltage controlled oscillator, or other means, the beam angle can be varied arbitrarily (e.g., randomly or in a scanning mode). Two of these acousto-optic deflectors positioned in tandem at right angles are capable of sweeping the beam in a two-dimensional raster pattern at television scan rates. Resolution and repeatability of the beam angle can be on the order of one part in two thousand. Scan patterns having five hundred horizontal lines with five hundred points per line are typical. Output beam maximum deflection angle on the order of two degrees could be increased with lenses, if necessary, before filling the objective lens rear entrance pupil and focusing onto a microscopic spot which illuminates the object. A beam scanning arrangement of this type is described by Suzuki et al, "Development Of A Real Time Scanning Laser Microscope For Biological Use", appearing in Applied Optics, Vol. 25, No. 22, Nov. 15 1986, pages 4115 through 4121. Clearly, then, the problem of rapidly and controllably scanning a laser beam across an object in a microscope has been substantially solved. However, in order to retain confocality, there still remains the problem of simultaneously scanning the pinhole so that it remains conjugate with the laser spot being swept in a raster pattern across the specimen at video rates. It is with this problem that the present invention is concerned. It is of more than passing interest to note that Suzuki et al consider the possibility of confocality for their scanning microscope; however, they decide against it because prior art confocal systems cannot be satisfactorily operated to provide a real-time, continuously moving image.

OBJECTS AND SUMMARY OF THE INVENTION

It is therefore an object of the present invention to provide a method and apparatus for scanning the pinhole of a confocal scanning laser microscope at video scan rates.

It is another object of the present invention to provide a confocal scanning laser microscope having no moving mechanical parts and requiring no scanning movement of the scanned specimen.

Another object of the preset invention is to provide a confocal scanning laser microscope having greatly increased imaging speed as compared to confocal scanning laser microscopes of the prior art.

Yet another object of the present invention is to provide a confocal scanning laser microscope having greater mechanical simplicity and ruggedness compared to prior art confocal scanning laser microscopes.

It is a further object of the present invention to provide the aforementioned improvements in confocal scanning laser microscopes without substantially compromising the advantages of prior art confocal scanning laser microscopes, namely: (a) the ability to produce optical sections as thin as approximately one micron in thickness while essentially ignoring light emanating from above or below the selected object plane; (b) approximately forty percent increased lateral and axial resolution (i.e., a thinner, more selective point spread function resulting in sampling from a volume one-third the minimum sample volume of a conventional laser microscope); (c) the general advantages of a scanning process, such as flexibility of varying system parameters (e.g., more rapidly imaging a smaller area, etc.), ease of digital image storage and enhancement signal processing, and the ability to utilize different modes of imaging and (d) increased sensitivity.

In arriving at the present invention I considered numerous ways to scan the pinhole of a confocal scanning laser microscope at video scan rates. Initially I considered mechanical solutions to this problem. However, in view of the enormous accelerations involved, even for minute amplitudes, it is unlikely that a mechanical solution exists. I also considered the utilization of some electro-optic imaging system in which one could effectively create a pinhole by ignoring all received light except from a point on the imaging device conjugate to the laser spot in the specimen. An initial and obvious approach along these lines would involve the use of an array of charge coupled devices (CCD). Specifically, if it were possible to selectively enable, and then disable, and then read out individual devices in the array in synchronization with the laser scan rate, an effective moving pinhole would be created. However, existing devices do not permit this to be done. Alternatively, repeatedly, reading out the contents of an entire line in a CCD array in order to obtain a single advancing point is unacceptable since it takes much too long for real-time imaging. An additional problem with this approach is that the array elements have an effective "memory"; that is, they accumulate charge corresponding to incident light between readouts, so that the arrangement does not truly function as an instantaneous mechanically scanned pinhole. Similar "memory" problems exist when one considers using a vidicon or other type television camera tube presently in use.

In accordance with the present invention I employ an image dissector tube (IDT) to provide what is effectively a non-moving scanned pinhole for a confocal scanning laser microscope. Early image dissector tubes are disclosed in U.S. Pat. Nos. 2,037,711 (Farnsworth); 2,100,842 (Farnsworth); 2,124,057 (Farnsworth); 2,216,265 (Farnsworth); 2,160,672 (Ploke); 2,459,778 (Larson); and 2,412,086 (Hallmark). The image dissector tube provides an output current having an amplitude dependent upon the incident light at a particular instant and not on the accumulated light which has been received since the last readout. Typically, an optical image is focused onto a photocathode and converted to an electron image. In the present invention the optical image is the image of the object being illuminated by the microscopic scanning laser spot. The electrons are accelerated down the tube toward a baffle plate and brought to a focus at the plate by a set of coils at the tube periphery. A tiny aperture, on the order of twenty-five microns in diameter, is located at the center of the baffle plate and permits some of the photoelectrons to proceed past the baffle plate where they are multiplied by an electron multiplier to provide an output current. The electrons which are not aligned with the aperture are blocked and ignored. In this manner the image dissector tube acts like a photomultiplier tube which is completely blocked off except for a pinhole. However, the IDT has the additional feature that the electron image, accelerating down the tube, can be transversely displaced in two dimensions with great precision so that the part of the electron image (and therefore the optical image) aligned with the pinhole at any instant can be precisely controlled. With appropriate deflection signals applied to the X and Y deflection coils of the tube, the image can be scanned in a raster pattern at television scan rates, or in random access modes. Since the IDT has no memory of previous light (it has a response time measured in nanoseconds), the effect is one of having mechanically scanned a pinhole over the cathode of a photomultiplier tube.

Image dissector tubes are capable of resolving thousands of television lines, far in excess of what is needed for a confocal scanning laser microscope. The point spread function of the electron beam imaging is between five and seven microns, which is less than twenty five percent of a typical aperture size. Therefore, the image resolution is not significantly degraded by transduction from light to electron optics. For low level light work the image dissector tube is photon-limited and uses the same photocathode material as an image intensifier or low light level television camera tube. Moreover, with its enormous "noise-free" gain, the image dissector tube potentially has an even better signal-to-noise ratio than a system using microchannel plate image intensifiers in front of a television tube. Image dissector tube dark current is truly negligible because the baffle plate blocks most of it. Dark background is determined by leakage current, typically 0.1 nanoamps which is comparable to the best photomultiplier tubes used for photon counting.

Accordingly, the confocal scanning laser microscope of the present invention employs a two-axis acousto-optic laser beam deflection system and a two-axis deflected image dissector tube serving as an effective pinhole conjugate with the laser spot as it sweeps out its raster pattern in the specimen, and a system to image the illuminated object onto the IDT photocathode. Synchronization and alignment of the laser deflection scan and the image dissector tube scan are effected at the high video scan rates to provide a real time video image on a television monitor. All moving parts required to effect scanning in the prior art are eliminated, and the capability of providing images at television frame rates, instead of every two to ten seconds, greatly enhances the ability to monitor dynamic phenomena while increasing the ease of focusing and image location. Overall reliability is far superior to existing confocal scanning laser microscopes and tandem scanning systems since precision mechanical lateral scanning equipment and/or rotating discs with bearings and critical alignment problems are not utilized.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings wherein like reference numerals in the various figures are utilized to designate like components, and wherein.

DESCRIPTION OF THE PREFERRED EMBODIMENTS

Figure 1:
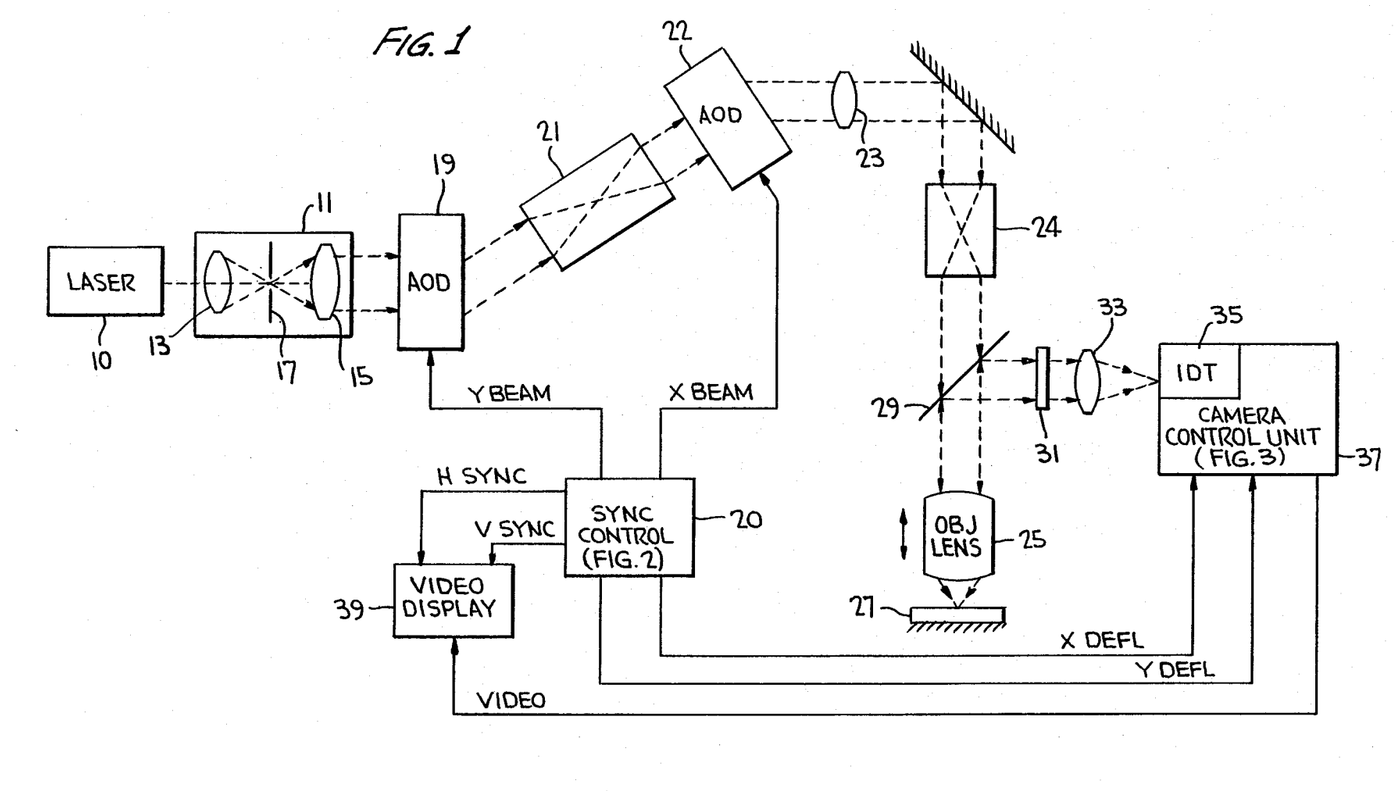
FIG. 1 is a schematic illustration of one form of confocal scanning laser microscope constructed in accordance with the principals of the present invention.

Referring specifically to FIG. 1 of the accompanying drawings, a laser 10 emits a collimated beam of light that passes through a beam expander 11 shown schematically as comprising a pair of lenses 13, 15. A pin hole spatial filter in screen 17 eliminates higher spatial harmonics in the beam. The collimated beam issuing from beam expander 11 is directed onto the entrance pupil of an acousto-optical deflector (AOD) 19 which has a deflection plane located at its exit pupil. The "deflection plane" for the acousto-optical deflectors used in the present invention is the plane at which the beam changes direction. The beam is selectively deflected by AOD 19 in a first beam plane through an angle that is a function of the frequency of the Y(beam) signal applied to AOD 19 from a synchronization control circuit 20. The deflected beam is then passed through a relay lens system 21 of the type disclosed, for example, in the aforementioned Suzuki et al article. In particular, relay lens system 21 typically includes a pair of lenses having the same focal length (f) and spaced along the optical axis by twice that focal length (2f). The two lenses, therefore, define a confocal lens system with a beam crossover located midway between the two lenses. The deflecting plane of AOD 19 is spaced by the focal distance (f) from the first of the two lenses in relay lens 21. A second AOD 22 has its entrance pupil spaced by the focal distance (f) from the second of the two lenses in relay lens system 21. AOD 22 selectively deflects the beam emanating from relay lens system 21 through an angle determined by the frequency of applied signal X(beam) in a second beam plane orthogonally disposed relative to the aforementioned first beam plane within which the beam is deflected by AOD 19. The images of the beam on the first beam plane at AOD 19 and the second beam plane at AOD 22 are conjugate to one another and are equal in size. These images may be considered the respective pupils of AOD 19 and AOD 22. All of the parallel rays of the beam passing through the pupil of AOD 19 enter the pupil of AOD 22 as parallel rays and subtend the same angle with the optical axis of relay lens system 21. This arrangement, as described by Suzuki et al, results in optimum operation of the acousto-optical deflectors AOD 19 and AOD 22 to effect the necessary television-type raster scan of the beam along the specimen or object plane (described below). If, for example, the focal lengths of the two lenses in relay lens system 21 differ, the angle of the beam leaving the pupil of AOD 19 is not equal to the angle of the beam incident at the pupil of AOD 22, resulting in different magnifications for the two orthogonal deflections and, therefore, in a distortion of the ultimate image.

The beam deflected by AOD 22 is passed through a cylindrical lens 23 having a long focal length and employed to compensate for the acousto-optical chirp cylindrical lens effect which changes the laser spot focus point and decreases the resolution of the system when AOD 22 is operated at high frequencies. No such compensation is required for AOD 19 because the rate of change of the frequency of the applied electrical signal Y(beam) is either so small as to make the effect negligible, or it is zero for the duration of the horizontal scan.

The exit pupil of AOD 22 is imaged onto the entrance pupil of an objective lens 25 by means of a second relay lens system 24. The diameter of the laser beam is comparable to the diameter of the rear entrance pupil of the objective lens 25 and has an intensity versus transverse distance from the beam center which is a Gaussian function. Objective lens 25 focuses the beam as a small spot on an object or specimen located on a specimen support stage 27. The depth of the focused spot in the specimen is controlled by adjusting either the axial position of objective lens 25 or the axial position of stage 27. The focused spot scans the specimen, within the plane of focus, in a raster pattern under the control of AOD 19 and AOD 22.

The scanning beam passes from relay lens system 24 to objective lens 25 through a dichroic mirror 29 employed to deflect the scanned image reflected from the specimen back along the light path through objective lens 25. The deflected image is passed through an emission filter 31 to a lens 33 which focuses the reflected image onto the photocathode of an image dissector tube (IDT) 35. The television-type raster pattern scanned by the beam in the specimen results in a similar raster scan of the illuminated specimen image on the photocathode of IDT 35.

The image dissector tube is a well-known device and needs not be illustrated or described in detail. For present purposes it is only necessary to recognize that the tube operates as an effective photomultiplier having a small electronically-movable photocathode area which can, therefore, be operated as an all electronic, low-inertia microphotometer. An electron lens accelerates and focuses all electrons emitted from each point on the photocathode to a corresponding single point in the plane of a dissecting aperture. The resulting electron image, current density modulated according to the optical input radiation pattern, is then electronically deflected across the aperture. The aperture, at any instant of time, thus samples the photoelectrons from a small, well-defined area of the input optical image incident on the photocathode. Photoelectrons passing through the aperture are multiplied in an electromultiplier and emerge as a current in the output anode circuit of IDT 35.

The output signal from an image dissector tube is typically a current having an amplitude proportional to input irradiance integrated over the small area of the aperture in the baffle plate (or the effective aperture) at any instant of time. The output current amplitude remains proportional to the input irradiance over a range of frequencies extending from d.c. to in excess of 20 MHz and over a large range of output current amplitudes. The video output signal illustrated in FIG. 1 corresponds to the output voltage from a video preamplifier fed by the output current from IDT 35 and is applied by the camera control unit 37 to a video display 39. The video display 39 is a cathode ray tube (CRT) device, typically a television monitor, that receives horizontal (H SYNC) and vertical (V SYNC) signals from the synchronization control circuit 20 in timesynchronization with the laser beam scan and the aperture scan in IDT 35. The synchronization control circuit 20 is described in detail below in relation to FIG. 2; the camera control unit 37 is described in detail below in relation to FIG. 3. The video display may be replaced by a video storage device such as a VCR, VTC, frame grabber, etc.

The system illustrated in FIG. 1 is configured for fluorescence microscopy and the reflected light image is therefore reflected by dichroic mirror 29 (as opposed to a beam splitter) and passes through an appropriate emission filter 31. For non-fluorescence, reflected-image embodiments, the dichroic mirror is replaced by a beam splitter, the emission filter 31 is omitted, and various polarizers, quarter-wave plates, Wollaston prisms, etc., may be employed if desired, to realize a variety of imaging modes.

Laser 10 may be an argon ion laser nominally operating at a wavelength of 488 nm. Of course, other lasers may be employed. Objective lens 25 may be an oil immersion non-fluorescing lens having a magnification of approximately one hundred and a numerical aperture (NA)=1.3. Of course, other objective lenses may be used.

Figure 2:
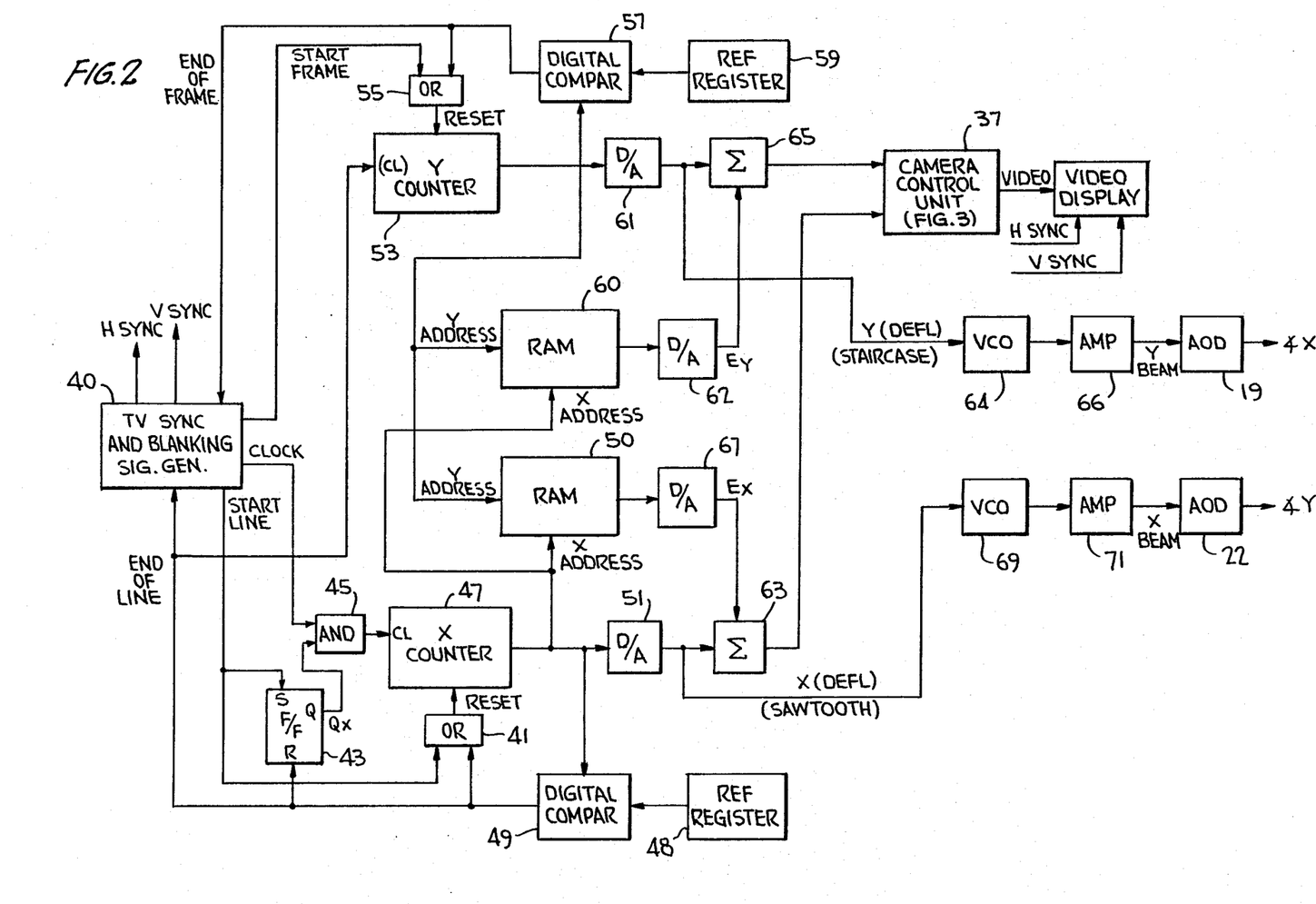
FIG. 2 is a functional block diagram of synchronization control circuitry employed to synchronize and align the scans of the laser beam and the image dissector tube utilized in the microscope of FIG. 1.
Figure 4:
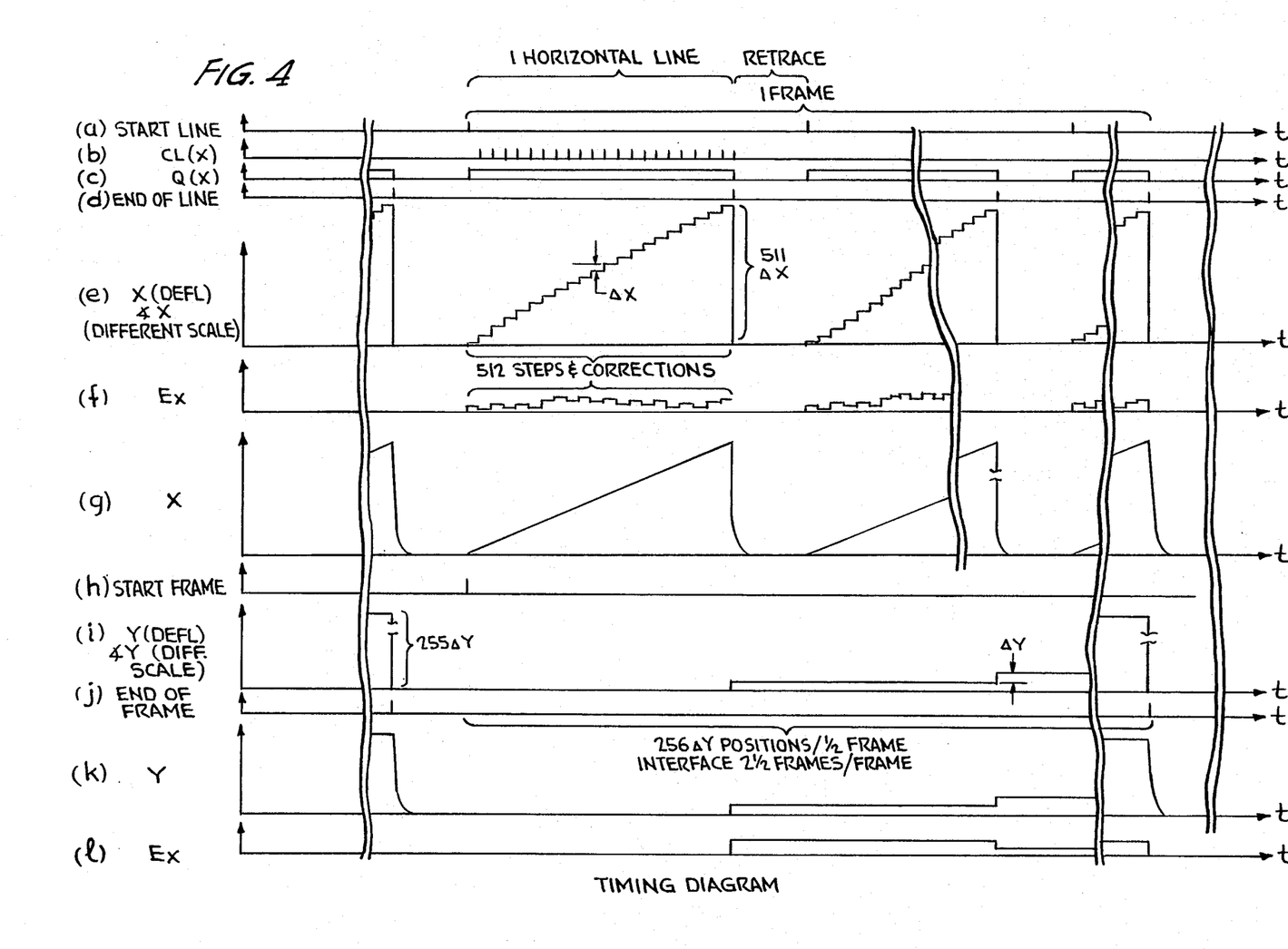
FIG. 4 is a timing diagram illustrating the relative timing of various signals appearing in the synchronization control circuit of FIG. 2.

Referring to FIG. 2 of the accompanying drawings, the synchronization control circuit (designated by the numeral 20 in FIG. 1) includes a television synchronization and blanking signal generator 40 which generates a plurality of timing signals. The START LINE signal, generated at the start of each line of the raster scan, and illustrated in FIG. 4(a). of the timing diagram, is applied as one input signal of a two-input OR gate 41 and to the set input terminal of a flip-flop 43. The Q output signal from flip-flop 43, illustrated in timing diagram FIG. 4(c), is applied as one input signal to a two-input AND gate 45. The second input signal for AND gate 45 is a CLOCK signal comprising a train of pulses having a frequency equal to the pixel rate in the raster scan. More particularly, each raster line comprises a series of adjacent pixels or sampling intervals, the number of such intervals determining the horizontal resolution of the scanned image. The frequency of the CLOCK signal, therefore, is that required to establish the desired number of pixels or scan intervals for the duration of each scan line. For example, with a scan line active duration (i.e., duration exclusive of beam retrace) of fifty three microseconds, combined with a requirement for five hundred twelve pixels per line, a CLOCK frequency of 9.66 MHz is required. The output signal from AND gate 45 is illustrated in timing diagram FIG. 4(b) and is applied to the CLOCK input terminal of a binary counter 47.

The output signal from binary counter 47 is applied to a digital comparator 49, to an addressable random access memory (RAM) 50, to an addressable RAM 60, and to a digital-to-analog convertor 51. A second binary number applied to comparator 49 is a reference number derived from reference register 48. When the count in counter 47 reaches the reference number in register 48, comparator 49 generates an END OF LINE signal, illustrated in FIG. 4(d), that is applied to the synchronization and blanking signal generator 40, to the clock input terminal of a binary counter 53, to the reset input terminal of flip-flop 43, and to the second input terminal of OR gate 41. Typically, the number stored in reference register 48 is related to the number of CLOCK counts required to establish the desired number of pixels in each line. The END OF LINE signal is used at synchronization and blanking signal generator 40 to establish a count which ultimately results in the generation of the START FRAME signal illustrated in FIG. 4(h). At counter 53 the END OF LINE signal serves as a clock pulse to increase the count in that counter for each line in a video frame. At OR gate 41 the END OF LINE signal resets the pixel counter 47. In resetting flip-flop 43, the END OF LINE signal returns the Q output signal of that flip-flop to binary zero to inhibit AND gate 45 from passing subsequent CLOCK pulses to counter 47. It will be understood, therefore, that counter 47 counts pixels for each raster scan line and provides an output binary signal representative of the pixel count for the current line. The interval between START LINE pulses, as seen in FIG. 4(a), corresponds to the active portion of each scan line plus the retrace interval. The active portion is represented by the binary one level of the Q signal provided by flip-flop 43, the waveform for which is illustrated in FIG. 4(c). As indicated in FIG. 4(b), the count pulses for the pixel counter 47 are only applied to that counter during the active portion of the line interval.

Counter 53 is a line counter and is recycled for each frame. Specifically, the START FRAME pulse, illustrated in FIG. 4(h), is applied to one input terminal of an OR gate 55. The other input signal for OR gate 55 is the output signal from a digital comparator 57 that compares the binary count in counter 53 to a reference count in reference register 59. That reference count is related to the number of lines in each raster frame. When the binary line count reaches the reference line count, digital comparator 57 provides an END OF FRAME pulse, illustrated in FIG. 4(j), which resets counter 53 via OR gate 55. In addition, the END OF FRAME pulse is applied to the synchronization and blanking signal generator 40 to indicate that a video frame has been completed. The output count from line counter 53 is also applied to digital-to-analog convertor 61, and to the Y address input terminals of RAM 60 and RAM 50.

Digital-to-analog convertor 51 provides the X (DEFL) analog signal which, at any instant of time, is representative of the binary count in counter 47. This X (DEFL) signal is illustrated in FIG. 4(e) of the timing diagram and is applied to the voltage controlled oscillator (VCO) 69 and to a signal summing circuit 63. The ouput signal from VCO 69 is amplified by an amplifier 71 and applied as the X(BEAM) signal to AOD 22 to control the beam deflection effected by that acousto-optic beam deflector. Since the angle of beam deflection produced by AOD 22 is proportional to the frequency of the output signal from VCO 69, and the frequency of that output signal is proportional to the output signal provided by digital-to-analog convertor 51, it then follows that the beam deflection is proportional to the contents of counter 47, as desired. The waveform for the beam deflection effected by AOD 22 is illustrated in FIG. 4(e) of the timing diagram. The output signal from digital-to-analog convertor 61 is the Y (DEFL) signal, an analog signal which, at any instant of time, represents the count in line counter 53. The Y (DEFL) signal shown in FIG. 4(i) is applied to VCO 64 and to a signal summing circuit 65. The alternating output signal from VCO 64, having a frequency proportional to Y(DEFL), is amplified at amplifier 66 and applied to AOD 19 as the Y(BEAM) signal. The frequency of that signal controls the laser beam deflection angle produced by AOD 19. The waveform for the beam deflection effected by AOD 19 is illustrated in FIG. 4(i) of the timing diagram.

The RAMs 50 and 60 store respective correction values for each pixel position in a raster frame to compensate for system non-linearities. More particularly, each RAM grid location is selectively addressed by the current line and pixel counts to provide a digital output correction signal to assure that the beam deflections follow ideal waveforms as precisely as possible. Thus, the addressed digital correction signal in RAM 50 is converted by digital-to-analog convertor 67 to an analog signal $E_X$ illustrated in the timing diagram at FIG. 4(f) and applied to summing circuit 63 along with the X (DEFL) signal. The summed output signal, which is the X (DEFL) signal corrected for X-direction beam deflection non-linearities at the present scan position, serves as the X input signal for camera control unit 37. Since the aperture deflection produced by the camera control unit 37 is proportional to the output signal provided by summing circuit 63, it then follows that the aperture deflection is proportional to the nominal laser spot position plus a small precalibrated correction that causes the aperture and spot position to be perflectly aligned in spite of non-linearities in the optics, etc. The waveform for the aperture deflection is illustrated in FIG. 4(g) of the timing diagram.

A similar technique is employed for beam deflection in the Y direction. The individually addressed Y-direction linearity corrections at RAM 60 appear as digital signals that are converted to analog form at digital-to-analog convertor 62. The analog output signal $E_Y$ from digital-to-analog convertor 62 is summed with the Y(-DEFL) signal at summing circuit 65, and the resulting signal is applied to the Y input terminal of camera control unit 37. The aperture deflection is therefore proportional to the sum of the amplitudes of the Y (DEFL) and Y correction signals. The waveform of output signal $E_Y$ from digital-to-analog convertor 62 is illustrated in FIG. 4(l); the waveform for the aperture deflection is illustrated in FIG. 4(k)

Although the preferred circuitry illustrated in FIG. 2 functions to modify aperture deflection to compensate for system non-linearities (if any), it will be understood that the laser deflections can be modified instead.

Figures 3, 5:
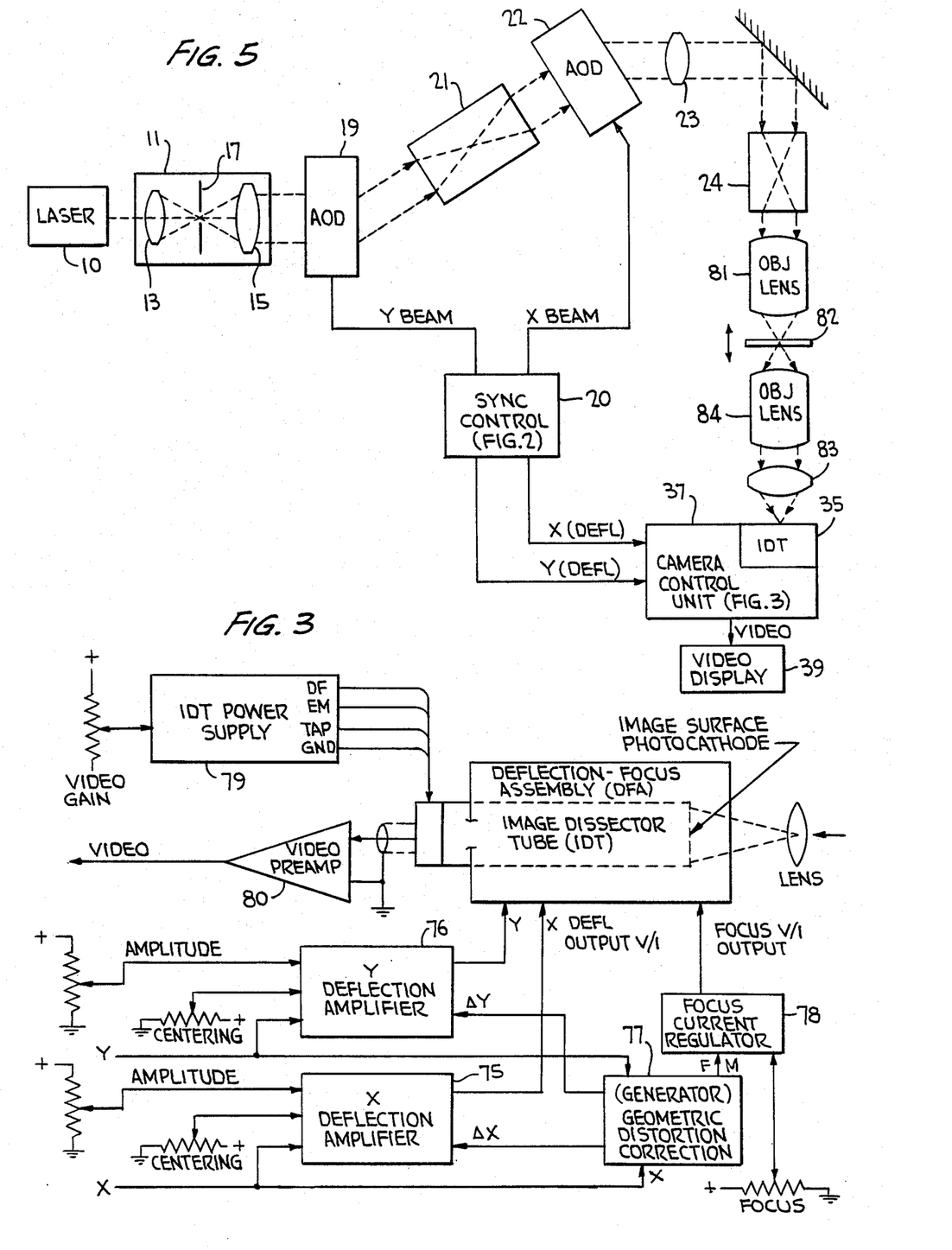
FIG. 3 is a functional block diagram of a camera control unit utilized to apply scan deflection signals to the image dissector tube in the microscope of FIG. 1.
FIG. 5 is a schematic diagram of an alternative embodiment of the confocal scanning laser microscope of the present invention.

The camera control unit 37 (FIGS. 1 and 2) is illustrated schematically in FIG. 3 to which specific reference is now made. The X signal derived from summing circuit 63 (FIG. 2) is applied to an X deflection amplifier 75 and to the X input terminal of a geometric distortion correction generator 77. The Y signal provided by summing circuit 65 (FIG. 2) is applied to a Y deflection amplifier 76 and to the Y input terminal of geometric distortion correction generator 77. Deflection amplifiers 75 and 76 may be the type manufactured by Washburn Laboratory, Inc. of Pleasantville, N.Y. as deflection amplifier Type AD. The output signals from deflection amplifiers 75 and 76 drive the X and Y deflection circuits for IDT 35. The geometric distortion correction generator 77 provides correction signals to amplifiers 75 and 76 so that the actual effective aperture scanning pattern approximates the pattern commanded by the X(DEFL) and Y(DEFL) signals to a high dress of accuracy, e.g., one part in three thousand. In addition, the geometric distortion correction generator 77 also provides a control signal for focus current regulator 78 utilized to provide a focus signal for IDT 35. Elements 75, 76, 77 and 78 may be purchased as part of a camera control unit made commercially available by Washburn Laboratory, Inc. of Pleasantville, N.Y. as part number CCU-S130. The individual components may also be purchased from the same company. For example, deflection amplifiers 75 and 76 may be a Type AD deflection amplifier designed primarily for driving inductive coil loads for CRT applications and are excellent power amplifiers for driving all kinds of reactive/resistive loads. A double-ended output signal is provided from a complementary-symmetry circuit that provides positive and negative deflection in a single-ended yoke coil. The amplifier is d.c. coupled and has a response up to several megahertz with provision for frequency compensation of non-linear loads. The focus current regulator 78 may be the Washburn Type IR-/IM. The Type IR current regulator is primarily designed as a highly stable constant current source for energizing electromagnetic CRT components such as focus coils, beam deflections offset or alignment coils and astigmator coils. The current regulator additionally supplies moderate amounts of drive at moderate frequencies in order to provide focus modulation or dynamic beam positional or distortion corrections. It has provisions for external focus control adjustment as well as the illustrated input for focus modulation components.

The geometric distortion correction generator may be the Type IC/CG unit sold by Washburn Laboratory, Inc. Geometric distortion is inherent in any cathode ray tube system (including an image dissector tube), whether it be for image pickup, storage, display or other purpose. The magnitude and causes for distortion are varied. They are present to some extent in all system elements (i.e., mechanical, optical, circuitry, electromagnetic components, electron beam generating structures, and in the geometry of the deflection process). Regardless of the cause for distortion, for each system element it can be expressed in terms of a power series. The total system distortion is a power series comprising the algebraic summation of individual components for all of the system elements. The geometric distortion correction generator provides power series correction components, generated on a continuous basis from d.c. to relatively high response speeds, from X and Y input signals. The generator compensates for most of the distortions that may effect any type of CRT system. The generator can also provide the focus modulation signal (FM) as well as the two control signals for deflection amplifiers 75 and 76. These latter signals contain the required second order distortion correction components.

A power supply 79 for the image dissector tube provides the voltages and currents required to operate the tube. Video preamplifier 80 amplifies the anode output current from the image dissector tube to provide the VIDEO output signal.

The microscope system illustrated in FIG. 1 operates in the reflection mode whereby light from the illuminated portion of the specimen is reflected back through the objective lens 25 so that it may be deflected by dichroic mirror 29 or a beam splitter along a detection path. The invention is also appropriate for transmission mode operation and an embodiment operating in the transmission mode is illustrated in FIG. 5. Many of the same components illustrated in FIG. 5 are also illustrated in FIG. 1 and bear the same reference numerals. The difference occurs as the scanned laser beam emanates from the relay lens system 24. Instead of passing through dichroic mirror 29 (FIG. 1) or a beam splitter, the beam is passed through first objective lens 81 arranged to focus the beam onto a specimen disposed on a specimen stage 82. Light passing through the specimen is transmitted through a second objective lens 84 focused on the same object plane. The emerging beam passes through a lens 83 which focuses the beam onto the photocathode of IDT 35. Changes in the plane of focus of the beam within the specimen are effected by moving the stage 82 and lens 84 appropriately.

For a laser emitting light at a wavelength of 488 nm, and a Gaussian intensity profile across the laser beam, the sharpest diffraction limited focus occurs at the beam waist of diameter $d_s$ defined by the location at which the intensity has fallen to $1/e^2$ on each side of the center line. This occurs at the focal plane of the lens. This diameter may be represented by the expression: $d_s=(2\lambda/(NA\pi))$ 0.25 micron where an NA of 1.3 has been assumed. The diameter for the diffraction limited one-half power points of a Gaussian beam are represented by $d_p=(0.59)(d_s)=0.15$ micron.

Sampling considerations indicate that a good tradeoff between not losing information and not over-sampling is to have succeeding horizontal scan lines deflected vertically by the distance $\Delta h$ set equal to the half power intensity $d_p$, so that for the above diffraction-limited conditions, $\Delta h$ is equal to 0.15 micron. If the field is made up of five hundred scan lines, then the total field in the vertical direction is (500) (0.15), or 75 microns. Each horizontal scan has a length of (500) $\Delta h$, and the system bandwith must be large enough so that the horizontal resolution is maintained equal to the vertical resolution. The required vertical deflection angle $\Delta\theta$ per line at the objective lens entrance pupil is represented by $\Delta\theta=\theta h/f_o$, where $f_O$ is the focal length of the objective lens. This deflection $\Delta\theta$ is $7.9\times 10^{-5}$ radians for defraction limited conditions with a 100× lens having a focal length of 1.91 mm. The total vertical scan angle $\theta$ is given by the expression: $\theta=500$ $\Delta\theta 0.039$ radians=2.25°. This angle is readily obtainable from commercially available $TeO_2$ acousto-optic beam deflectors. Alternatively, the angle may be obtained, starting with a smaller $\theta$ out of the AOD, after the beam is passed through a beam contractor to increase $\theta$. Similarly, the total horizontal scan angle is 2.25° for a 75 micron horizontal field.

If aberrations result in a spot size which is substantially greater than the diffraction-limited diameters set forth above, the field may be proportionately increased. This is best accomplished with a beam contractor (i.e., an inverse telescope) to increase $\Delta\theta$ and $\theta$ rather than changing the excitation frequencies of the acousto-optical deflectors, since the piezoelectric devices are designed for optimum operation at the recommended excitation frequencies. The acousto-optic deflectors do not add significant aberrations to the system.

If the wavelength of the laser beam is to be changed, there are several factors which must be considered. Since $d_s$, $d_p$, $\Delta\theta$ and $\theta$ are all proportional to the wavelength, the primary effect of a wavelength change is a change in field size and resolution, with no change in sampling characteristics or gaps between raster lines. A secondary effect, requiring compensation, arises due to the effective cylindrical lens produced by a scanned acousto-optic deflector. The focal length of such a device ($f_{a/o}$) is represented by the expression: $f_{a/o}=V^2T/\lambda\Delta f$, where v is the velocity of sound in the crystal, $\Delta f$ is the change in acoustic frequency of the excitation frequency applied to the acousto-optic deflector, and T is the line scan time during which the change in frequency of the control signal is effected. A cylindrical lens used to compensate for the effective focal length of the acousto-optic deflector at one laser wavelength must be changed when another laser wavelength is employed unless $\Delta f$ is changed so as to keep the product ($\lambda\Delta f$) constant.

The nominal dwell time at each horizontal point along a scan line is approximately equal to the effective scan line duration (i.e., 50 microseconds) divided by the number of pixels in a line (i.e., 500 pixels) or 0.1 microseconds per point. The nominal "fill time" for the acousto-optic beam deflector (i.e., the time for a pressure wave to cross the optical aperture) is typically 10 microseconds. Therefore, a gradient of sound wavelengths is present in the aperture at any given instance of time, resulting in the above-described acousto-optic lens focal length ($f_{a/o}$) for which compensation is provided by a real lens so that a parallel beam emerges from the acousto-optic deflector. As the control signal excitation frequency sweeps through the aperture, the emergent angle of the beam $\theta$ changes so that the point moves continuously across the object or specimen.

In order to avoid bleaching fluorochromes, the time integral of light intensity (in microwatt-seconds/$cm^2$) must not exceed a prescribed level. Since the laser spot only dwells at a given position for about 0.1 microseconds, it can be enormously brighter than if it illuminated the entire field for a 1/30 second television frame. A reasonable threshold number to use for a single television frame is $80\times 10^{-3}$ watts/$cm^2$ for 1/30 seconds. To maintain the same single frame exposure with the laser beam illuminating 500×500 points in 1/30 seconds, the laser beam is required to have an intensity ($I_b$) of $(80\times 10^{-3}$ watts/$cm^2)$ $(0.25\times 10^6)=2\times 10^4$ watts/$cm^2$. The total power in the beam is on one order of $(I_b)$ (2) $(d_p^2)=(2\times 10^4)$ (2) $(0.022\times 10^{-8})$ watts, or $8\times 10^{-6}$ watts. If a scan is changed so that the dwell time per pixel is different, then $I_b$ must be changed if the same exposure is to be maintained.

Since the acousto-optic deflection efficiency is not constant for all deflections, the total power ($I_b$) varies on the order of twenty percent during a scan interval. Since the variation occurs gradually over many pixels, it is not objectionable. However, compensation for this may be obtained by placing an acousto-optic modulator between the laser and the acousto-optic deflector, and controlling the modulator in an open or closed loop fashion.

If the laser spot is diffraction-limited, the beam diameter ($d_s$) at the $1/e^2$ points is 0.25 microns and the half-power diameter ($d_p$) is 0.15 microns, both taken at the focal plane. The scanned illuminated spot is imaged into the moving aperture of IDT 35. Since the microscope objective is focused at infinity, a collimated beam of light emerges from the exit pupil at an angle dependant upon the position of the scanned illumination spot. A focal length F is used to focus the collimated beam onto a spot on the photocathode of IDT 35. This focal length F is selected so that beam diameter $d_s$ is focused into a spot to match an aperture diameter $d_a$. Focal length F is determined by: $F=f_o$ $(d_a/d_s)=191$ mm, where a value of $f_o$ 1.91 mm is assumed, and a standard aperture size of 25 microns in diameter is selected. Since the total deflection angle of the beam emerging from the objective is 0.039 radians, the required photocathode size in IDT 35 is determined as follows: $S=F\Delta\theta=(0.039)$ $(191)=7.4$ mm. A one inch diameter image dissector tube (such as that manufactured by the electro-optical products division of (ITT, Ft. Wayne, Ind.) has a cathode of 0.56 inches in diameter which, for a 1:1 aspect ratio picture, yields a 10 mm×10 mm usable cathode. This provides a twenty-five percent safety margin in both directions in the event that some parameters are changed. Thus, a one inch diameter image dissector tube can be utilized rather than a more bulky and costly tube. The electron beam point spread function is on the order of five microns or less, a small fraction of the aperture diameter. Image resolution is not significantly compromised by the transformation from light optics to electron optics.

If the wavelength of the laser is changed, the object spot and its image at the IDT 35 will change in proportion to wavelength. However, since the aperture is unchanged, the match between the spot image and aperture changes. For small changes in wavelength (for example from 488 nm to 514 nm) the truncation is negligible. Even for a 632 nm helium-neon laser, only twenty-five percent of the spot power is lost. Conversely, for shorter wavelengths, more background illumination passes through the aperture; however, this effect is negligible for wavelengths employed in the subject invention. In addition, aperture deflections in IDT 35 must be changed along with wavelength changes since the overall field is proportional to wavelength. With a helium-neon laser the required field S' is still able to fit into a one inch image dissector tube. Specifically, this field may be determined as follows:
$S' = S (632/488) = (7.4 \text{ mm}) (632/488) = 9.6 \text{ mm}$.

Due to its extremely low background levels for low light level applications, e.g., fluorescence, the signal-to-noise ratio of the image dissector tube is limited by photon statistics at the photocathode so that the signal-to-noise power is approximately equal to the number of photons. Photoelectrons passing through the aperture undergo a substantially noise-free gain of typically $0.5 \times 10^6$ (i.e., the photocathode noise is increased by a noise factor of typically two to three). Image dissector tubes utilize photocathodes made of the same material (e.g., S-20) as photon counting photomultiplier tubes and image intensifier tubes etc. Therefore, image dissector tubes have as good a signal-to-noise ratio as the best low level light intensified television systems. It must be remembered that the signal-to-noise issue is only of relevance in low light level fluorescence work where fluorochrome bleaching is to be avoided by limiting the time integral of illumination intensity to some predetermined exposure. The fact that the image dissector tube does not integrate the light during a complete television frame (as in an ordinary television tube) does not matter. The illumination intensity can be increased dramatically because of the short dwell time per pixel consistent with maintaining a fixed exposure, and the sample is only exposed to illumination which contributes to the image. Therefore, nothing is lost by not integrating the output flux while the remainder of the frame is being scanned.

The circuitry illustrated in FIG. 2 permits the aperture scan and the acousto-optic deflector scan to be aligned with sufficient accuracy to achieve a good image quality while utilizing an aperture size that does not permit an unacceptable amount of background out-of-focus illumination to pass through the image dissector tube.

Although the preferred embodiment described herein employs the beam scanning technique disclosed by Suzuki et al, it is to be understood that other beam scanning techniques may be employed. It is preferable that these beam scanning techniques avoid the use of moving parts so as not to unduly complicate the structure of the microscope. It is possible, for example, to utilize a different lens arrangement in conjunction with the acousto-optic deflectors. A zoom ocular in place of lens 33 would allow adjustment of the spot image to match the IDT aperture, if necessary due to use of different microscope objectives. A varable beam expander, in place of or immediately after relay lens system 24 would allow the laser beam diameter to be adjusted to appropriately fill the rear entrance pupil of different microscope objectives.

The image dissector tube is compatible with the requirement to provide real time images; that is, images in which the frame rate is greater than that which can be observed by the human eye. Typically, the frame rate should be twenty-four frames per second or greater. For standard NTSC television, a thirty frame per second rate is employed. Image dissector tubes are capable of providing frame rates well in excess of this requirement. In addition, the acousto-optic deflectors are capable of providing beam scan rates consistent with these requirements.

From the foregoing description it will be appreciated that the invention makes available a novel confocal laser scanning microscope having no moving parts and providing a real time display of the scanned specimen.

Having described preferred embodiments of a new and improved confocal laser scanning microscope constructed in accordance with the present invention, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What I claim is:

1. The method of providing a real time video image of a specimen comprising the steps of:
   (a) focusing a laser beam as an illuminated spot on a prescribed specimen plane;
   (b) scanning the laser beam to move the focused illuminated spot in a predetermined scan pattern on said specimen plane;
   (c) focusing an image of the moving focused illuminated spot onto a photocathode of an image dissector tube; and
   (d) converting the image focused on said photocathode to a displayed video image.

2. The method according to claim 1 wherein step (d) includes the steps of:
   (e) sampling successive locations of said photocathode in a sampling pattern configured to match said predetermined scan pattern and time-synchronized with said scan pattern; and
   (f) transducing the intensity of the image at each sampled photocathode location to an electron current having an amplitude proportional to the image intensity of the sampled photocathode location at each instant of time.

3. The method according to claim 2 wherein step (b) includes scanning the laser beam to move the illuminated spot in a raster pattern comprising successive frames, each frame having multiple scan lines extending in a first direction in said specimen plane and arranged in a positional sequence extending in a second direction in said specimen plane, said second direction being orthogonally-oriented to said first direction, each line comprising a linear array of successive pixels.

4. The method according to claim 3 wherein said successive locations on said photocathode correspond to respective pixels in said raster pattern.

5. The method according to claim 4 wherein step (b) further includes the steps of:
   (g) generating first and second control signals, each control signal having a repetitively variable frequency wherein the rate of frequency variation of said first control signal is much greater than the rate of variation of the frequency of said second control signal;
(h) deflecting said laser beam to move said illuminated spot in said first direction in which the spot position is a direct function of the frequency of said first control signal; and
(i) deflecting said laser beam to move said illuminated spot in said second direction in which the spot position is a direct function of the frequency of said second control signal.

6. The method according to claim 5 wherein step (c) comprises reflecting the image of the illuminated spot from the specimen plane to the photocathode of the image dissector tube.

7. The method according to claim 5 wherein step (c) comprises transmitting the image of the illuminated spot through the specimen plane to the photocathode of the image dissector tube.

8. The method according to claim 1 wherein step (b) includes scanning the laser beam to move the illuminated spot in a raster pattern comprising successive frames, each frame having multiple scan lines extending in a first direction in said specimen plane and arranged in a positional sequence extending in a second direction in said specimen plane, said second direction being orthogonally-oriented to said first direction, each line comprising a linear array of successive pixels.

9. The method according to claim 8 wherein step (b) further includes the steps of:
(g) generating first and second control signals, each control signal having a repetitively variable frequency wherein the rate of frequency variation of said first control signal is much greater than the rate of variation of the frequency of said second control signal;
(h) deflecting said laser beam to move said illuminated spot in said first direction in which the spot position is a direct function of the frequency of said first control signal; and
(i) deflecting said laser beam to move said illuminated spot in said second direction in which the spot position is a direct function of the frequency of said second control signal.

10. The method according to claim 8 wherein said frames are repeated at a rate at least equal to twenty-four frames per second.

11. The method according to claim 1 wherein step (c) comprises reflecting the image of the illuminated spot from the specimen plane to the photocathode of the image dissector tube.

12. The method according to claim 1 wherein step (c) comprises transmitting the image of the illuminated spot through the specimen plane to the photocathode of the image dissector tube.

13. A confocal scanning laser imaging system comprising:
laser source means for emitting a collimated beam of light;
lens means for focusing said beam to illuminate a spot in a plane of a specimen to be imaged;
scanning means for scanning said beam to move said illuminated spot in a predetermined pattern in said plane;
an image dissector tube having a photocathode with addressable locations and means for providing an output current proportional to the intensity of light impinging on the addressed location of the photocathode;
focusing means for focusing an image of said illuminated spot onto said photocathode; and
control means for addressing successive locations on said photocathode in synchronization with movement of said illuminated spot in said plane such that the addressed location is always at a portion of the focused image corresponding to the spot in said specimen plane illuminated by said laser beam.

14. The confocal scanning laser imaging system according to claim 13 wherein said scanning means includes means for forming said predetermined pattern as a television raster pattern having successive frames, each frame comprising multiple scan lines extending in a first direction in said plane and arranged in a positional sequence extending in a second direction in said plane, said second direction being orthogonally oriented to said first direction, each line comprising a linear array of successive pixels.

15. The confocal scanning laser imaging system according to claim 14 wherein said scanning means includes means for repeating said frames at a rate at least equal to twenty-four frames per second.

16. The confocal scanning laser imaging system according to claim 14 wherein the addressable locations on said photocathode correspond to respective pixels in said raster pattern.

17. The confocal scanning laser imaging system according to claim 14 further comprising:
synchronization means for generating first and second control signals, each control signal having a continuously repetitively variable frequency wherein the rate of frequency variation of said first control signal is much greater than the rate of variation of the frequency of said second control signal and;
wherein said scanning means includes:
acoustic-optic deflector means for deflecting said laser beam to move said illuminated spot in said first direction in which the spot position is a direct function of the frequency of said first control signal and;
further acoustic-optic deflection means for deflecting said laser beam to move said illuminated spot in said second direction in which the spot position is a direct function of the frequency of said second control signal.

18. The confocal scanning laser imaging system according to claim 13 wherein said focusing means comprises means for reflecting the image of the illuminated spot from the specimen to the photocathode of the image dissector tube.

19. The confocal scanning laser imaging system according to claim 13 wherein said focusing means comprises means for transmitting the image of the illuminated spot through the specimen to the photocathode of said image dissector tube.

20. The confocal scanning laser imaging system according to claim 13 wherein said scanning means includes no moving parts.

21. A method of providing a real time video image of a specimen, comprising the steps of:
(a) focusing a laser beam into an illuminated spot on a prescribed specimen plane;
(b) scanning the focused laser beam to move the illuminated spot in a predetermined scan pattern in said specimen plane;

(c) focusing an image of the moving illuminated spot onto an electo-optic imaging means having an array of plural individually addressable light sensor devices which light sensor devices may be each selectively addressed, enabled and read-out for providing an output signal corresponding to the incident light intensity impinging thereon;

(d) selectively addressing, enabling and reading-out individual light sensor devices in said array of said electro-optic imaging means in synchronization with scanned movement of said illuminated spot in said specimen plane to match said predetermined scan pattern such that the light sensor device currently being addressed, enabled and read-out is at a location in said array on which is incident a portion of the focused image of the moving illuminated spot, and outputting a signal from the light sensor device currently being addressed, enabled and read-out corresponding to the light intensity impinging thereon while so enabled; and (e) converting signals output from said electro-optic imaging means into a displayed video image of said speciman plane.

22. A confocal scanning laser imaging system, comprising:

laser source means for emitting a collimated beam of light;

lens means for focusing said beam to illuminate a spot in a plane of a specimen to be imaged;

scanning means for scanning said beam to move said illuminated in a predetermined scan pattern in said specimen plane;

electro-optic imaging means having an array of plural individually addressable light sensor devices which light sensor devices may be each selectively individually addressed, enabled and read-out for providing an output signal corresponding to the incident light intensity impinging thereon;

focusing means for focusing an image of said moving illuminated spot onto said electro-optic imaging means; and control means for selectively addressing, enabling and reading-out individual ones of said plural light sensor devices of said electro-optic imaging means in synchronization with scanned movement of said illuminated spot in said specimen plane, to match said predetermined scan pattern such that the one of said plurality light sensor devices being currently addressed, enable and read-out is always at a location in said array on which is incidentally impinging a portion of the focused image of the moving illuminated spot in said specimen plane.

* * * * *